United States Patent
Du

(10) Patent No.: US 8,824,796 B2
(45) Date of Patent: *Sep. 2, 2014

(54) IMAGE PROCESSING APPARATUS, IMAGE PROCESSING METHOD, AND COMPUTER-READABLE, NON-TRANSITORY MEDIUM

(75) Inventor: Jiyun Du, Kahoku (JP)

(73) Assignee: PFU Limited, Kahoku-shi (JP)

( * ) Notice: Subject to any disclaimer, the term of this patent is extended or adjusted under 35 U.S.C. 154(b) by 17 days.

This patent is subject to a terminal disclaimer.

(21) Appl. No.: 13/543,605

(22) Filed: Jul. 6, 2012

(65) Prior Publication Data
US 2013/0044953 A1 Feb. 21, 2013

(30) Foreign Application Priority Data

Aug. 18, 2011 (JP) ................................ 2011-178816

(51) Int. Cl.
G06K 9/38 (2006.01)
H04N 1/403 (2006.01)
G06K 9/32 (2006.01)

(52) U.S. Cl.
CPC .............. *G06K 9/3241* (2013.01); *H04N 1/403* (2013.01)
USPC ........................................................ 382/170

(58) Field of Classification Search
None
See application file for complete search history.

(56) References Cited

U.S. PATENT DOCUMENTS

| | | | |
|---|---|---|---|
| 4,736,315 A * | 4/1988 | Ozaki et al. ................... | 702/180 |
| 6,266,439 B1 | 7/2001 | Pollard et al. | |
| 6,363,162 B1 * | 3/2002 | Moed et al. ................... | 382/112 |
| 6,415,062 B1 * | 7/2002 | Moed et al. ................... | 382/260 |
| 6,473,522 B1 | 10/2002 | Lienhart et al. | |
| 6,507,670 B1 * | 1/2003 | Moed ............................ | 382/172 |
| 6,587,576 B1 * | 7/2003 | Wesolkowski ............... | 382/112 |
| 6,674,899 B2 * | 1/2004 | Nagarajan et al. ........... | 382/168 |
| 7,024,043 B1 | 4/2006 | Fujimoto et al. | |
| 7,379,594 B2 * | 5/2008 | Ferman et al. ............... | 382/176 |
| 7,386,168 B2 | 6/2008 | Misawa | |
| 7,475,807 B2 * | 1/2009 | Halpin et al. ................. | 235/378 |
| 7,522,760 B1 * | 4/2009 | Will et al. ..................... | 382/137 |
| 7,672,484 B2 * | 3/2010 | Wiedemann et al. ......... | 382/103 |
| 8,081,799 B2 * | 12/2011 | Wiedemann et al. ......... | 382/103 |
| 8,144,986 B2 | 3/2012 | Ma | |
| 8,150,202 B2 | 4/2012 | Mohanty et al. | |
| 8,306,325 B2 * | 11/2012 | Chang .......................... | 382/176 |
| 8,467,614 B2 * | 6/2013 | Fosseide et al. ............. | 382/209 |
| 2004/0136586 A1 * | 7/2004 | Okamura ...................... | 382/137 |

(Continued)

FOREIGN PATENT DOCUMENTS

| | | |
|---|---|---|
| JP | 6-113139 | 4/1994 |
| JP | 4077094 | 6/2000 |
| JP | 2007-28362 | 2/2007 |

*Primary Examiner* — Amir Alavi
*Assistant Examiner* — Alexander J Lesnick
(74) *Attorney, Agent, or Firm* — Christie, Parker & Hale, LLP

(57) ABSTRACT

There are provided an image processing apparatus, image processing method, and a computer-readable, non-transitory medium that can determine with high accuracy whether or not an input image contains a background element. The image processing apparatus includes a decimated image generator for generating a decimated image through pixel decimation from an input image, an edge pixel extractor for extracting edge pixels from the decimated image, an edge class extractor for extracting an isolated edge pixel from among the edge pixels, a histogram generator for generating an isolated histogram based on the isolated edge pixel, and a decision unit for making, based on the isolated histogram, a decision as to whether or not the input image contains a background element.

13 Claims, 13 Drawing Sheets

(56) References Cited

U.S. PATENT DOCUMENTS

| | | |
|---|---|---|
| 2006/0115141 A1* | 6/2006 | Koakutsu et al. ............ 382/139 |
| 2007/0019243 A1 | 1/2007 | Sato et al. |
| 2008/0050030 A1* | 2/2008 | Hara ............................ 382/254 |
| 2009/0252434 A1* | 10/2009 | Zhou ............................ 382/276 |
| 2010/0061629 A1* | 3/2010 | Ma ................................ 382/169 |
| 2013/0044952 A1* | 2/2013 | Du ................................ 382/170 |

* cited by examiner

| Model & Color | PD-KB200B/P (Black) PD-KB200W/P (White) | PD-KB200B/U (Black) PD-KB200W/U (White) |
|---|---|---|
| Key Specification | Membrane switch (3.8 mm stroke, soft snap) Cylindrical step sculpture 19.05 mm pitch | |
| Number of Keys | | 65 |

1202  1201

| Model & Color | PD-KB200B/P (Black) PD-KB200W/P (White) | PD-KB200B/U (Black) PD-KB200W/U (White) |
|---|---|---|
| Key Specification | Membrane switch (3.8 mm stroke, soft snap) Cylindrical step sculpture 19.05 mm pitch | |
| Number of Keys | | 65 |

1211

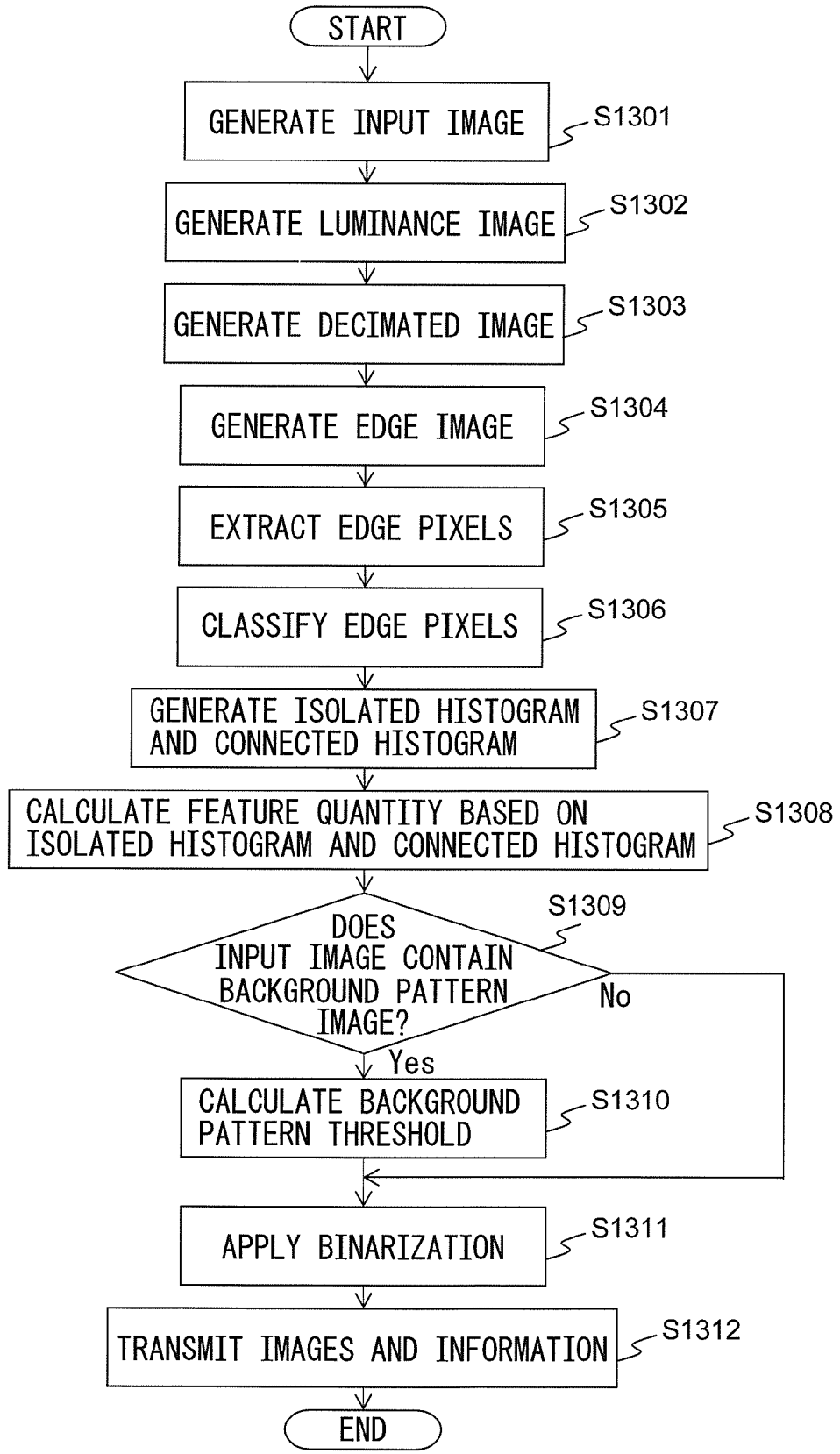

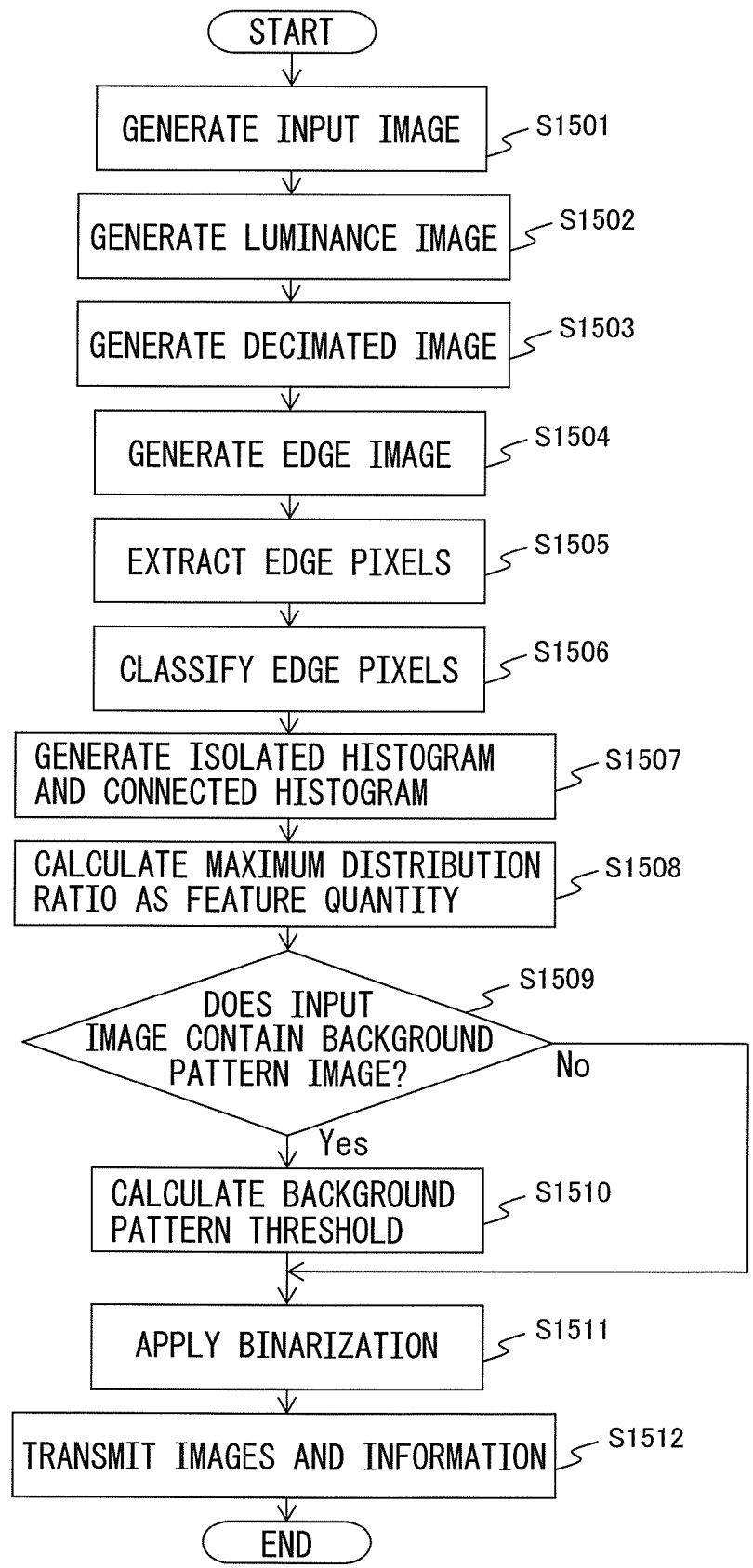

IMAGE PROCESSING APPARATUS, IMAGE PROCESSING METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2011-178816, filed on Aug. 18, 2011, the entire contents of which are incorporated herein by reference.

TECHNICAL FIELD

Embodiments discussed in the present specification relate to image processing technology.

BACKGROUND

To prevent forgery by copying, financial documents such as receipts, securities, and certificates are often preprinted with background patterns on which intended images such as characters are printed. When performing prescribed processing on documents preprinted with such background patterns, for example, when sorting the documents based on the printed images or when reading the characters using an OCR device (optical character reading device), the intended images printed on the documents must be accurately discriminated from the preprinted background patterns. However, since the density of the intended images and the density of the background patterns differ for different documents, it has been difficult to accurately discriminate the intended images from the background patterns.

In view of the above, there is proposed, in Japanese Laid-open Patent Publication No. 2007-28362, a check reading apparatus which removes a background pattern from image data acquired from a financial document such as a check and extracts only the contents of the document. To achieve this, the proposed check reading apparatus applies, to the original image data acquired by scanning the document, corrections so as to further increase the density of any pixel whose density is higher than its neighboring pixels and to further reduce the density of any pixel whose density is lower than its neighboring pixels. Then, the check reading apparatus creates a histogram representing the density distribution in the thus corrected image data, sets a binarization threshold somewhere between a crest appearing in a high-density region and a crest appearing in a low-density region, and performs binarization using the thus set binarization threshold.

On the other hand, in U.S. Pat. No. 6,507,670, there is proposed a system for removing a background pattern from a binary image. The proposed system divides the binary image into a plurality of image regions, calculates an image density value for each image region, counts the number of image regions associated with each image density value, selects as a threshold value an image density value that is lower than the image density value having the largest number of associated image regions, and setting any image region having an image density value smaller than the threshold value to zero.

SUMMARY

The check reading apparatus disclosed in Japanese Laid-open Patent Publication No. 2007-28362, which performs binarization using the above-set binarization threshold, can remove the background pattern from the original image data acquired by scanning the financial document. However, the check reading apparatus disclosed in Japanese Laid-open Patent Publication No. 2007-28362 works on the assumption that the original image data acquired by scanning contains a background pattern, and is not designed to discriminate whether the original image data contains a background pattern or not. Accordingly, with the check reading apparatus disclosed in Japanese Laid-open Patent Publication No. 2007-28362, it has not been possible to discriminate whether the original image data contains a background pattern or not, and thus it has not been possible to discriminate, for example, between a document having a background pattern and a document not having a background pattern.

On the other hand, the system disclosed in U.S. Pat. No. 6,507,670 can remove the background pattern by using the selected threshold value. However, the system disclosed in U.S. Pat. No. 6,507,670 is also not designed to discriminate whether the binary image contains a background pattern or not. Accordingly, with the system disclosed in U.S. Pat. No. 6,507,670, it has not been possible to discriminate whether the binary image contains a background pattern or not, and thus it has not been possible to discriminate between a document having a background pattern and a document not having a background pattern.

Accordingly, it is an object of the present invention to provide an image processing apparatus and image processing method that can determine with high accuracy whether or not an input image contains a background element, and a computer-readable, non-transitory medium storing a computer program for causing a computer to implement such an image processing method.

According to an aspect of the apparatus, there is provided an image processing apparatus. The image processing apparatus includes a decimated image generator for generating a decimated image through pixel decimation from an input image, an edge pixel extractor for extracting edge pixels from the decimated image, an edge class extractor for extracting an isolated edge pixel from among the edge pixels, a histogram generator for generating an isolated histogram based on the isolated edge pixel, and a decision unit for making, based on the isolated histogram, a decision as to whether or not the input image contains a background element.

According to an aspect of the method, there is provided an image processing method. The image processing method includes generating a decimated image through pixel decimation from an input image, extracting edge pixels from the decimated image, extracting an isolated edge pixel from among the edge pixels, generating an isolated histogram based on the isolated edge pixel, and based on the isolated histogram, making, using a computer, a decision as to whether or not the input image contains a background element.

According to an aspect of the computer-readable, non-transitory medium storing a computer program, the computer program causes a computer to execute a process, including generating a decimated image through pixel decimation from an input image, extracting edge pixels from the decimated image, extracting an isolated edge pixel from among the edge pixels, generating an isolated histogram based on the isolated edge pixel, and based on the isolated histogram, making a decision as to whether or not the input image contains a background element.

According to the image processing apparatus and the image processing method, and the computer-readable, non-transitory medium, it is possible to determine with high accuracy whether or not an input image contains a background element.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 13 is a flowchart illustrating another example of the sequence of operations for implementing the decision process.

FIG. 15 is a flowchart illustrating still another example of the sequence of operations for implementing the decision process.

DESCRIPTION OF EMBODIMENTS

An image processing apparatus, an image processing method, and a computer program will be described below with reference to the drawings. It will, however, be noted that the technical scope of the invention is not limited to the specific embodiments disclosed herein, but extends to the inventions described in the appended claims and their equivalents.

Figure 1:
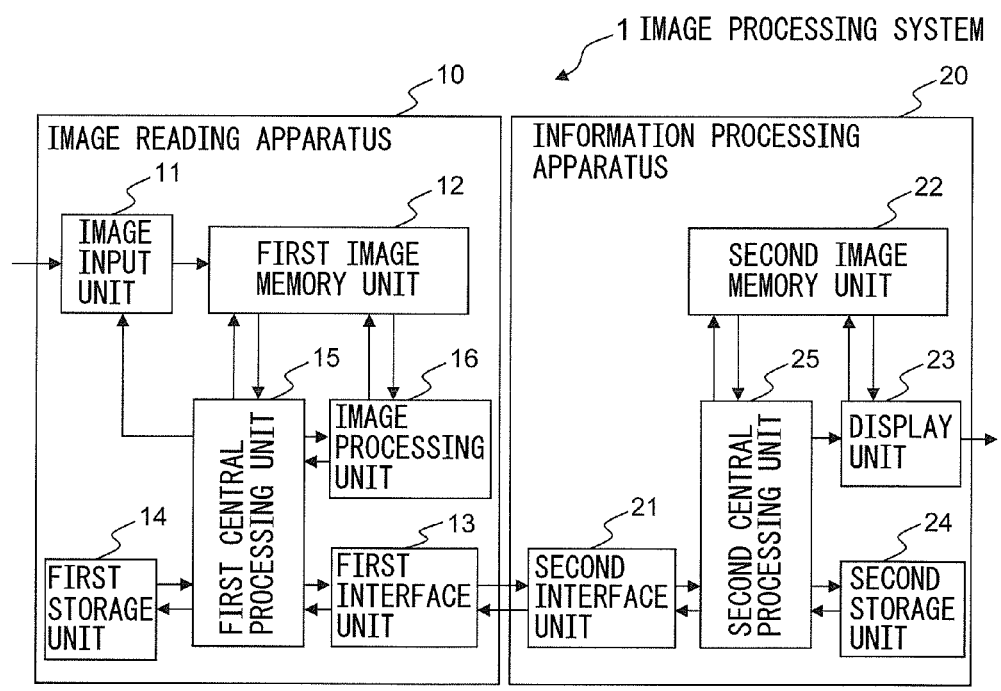
FIG. 1 is a diagram schematically illustrating the configuration of an image processing system.

FIG. 1 is a diagram schematically illustrating the configuration of an image processing system. As illustrated in FIG. 1, the image processing system 1 includes an image reading apparatus 10 and an information processing apparatus 20. The image reading apparatus 10 is, for example, an image scanner, a digital camera, or the like, and the information processing apparatus 20 is, for example, a personal computer or the like which is used for connection to the image reading apparatus 10.

The image reading apparatus 10 includes an image input unit 11, a first image memory unit 12, a first interface unit 13, a first storage unit 14, a first central processing unit 15, and an image processing unit 16. The various units constituting the image reading apparatus 10 will be described in detail below.

The image input unit 11 includes an image sensor for capturing an image of a subject such as a document, scene, person, or the like. The image sensor includes imaging devices, such as CCD or CMOS devices, arranged in a one-dimensional or two-dimensional array, and optics for focusing the image of the subject onto the imaging devices. Each imaging device outputs an analog value corresponding to each RGB color. The image input unit 11 generates pixel data by converting each of the analog values output from the image sensor into a digital value, and generates image data (hereinafter referred to as the input image) constructed from the pixel data. The generated input image provides color image data represented by a total of 24 bits of RGB values with each pixel data represented by 8 bits for each RGB color. The following description will be given by assuming that the subject whose image is to be captured is a document.

The first image memory unit 12 includes a storage device such as a nonvolatile semiconductor memory, a volatile semiconductor memory, a magnetic disk, etc. The first image memory unit 12 is connected to the image input unit 11 and stores the input image generated by the image input unit 11; the first image memory unit 12 is also connected to the image processing unit 16 and stores various kinds of processed images that the image processing unit 16 produced by applying image processing operations to the input image.

The first interface unit 13 includes an interface circuit conforming to USB or other serial bus architecture, and is electrically connected to the information processing apparatus 10 for transmission and reception of image data and various kinds of information. Further, a flash memory or the like may be connected to the first interface unit 13 so that the image data stored in the first image memory unit 12 may be transferred to the flash memory for storage.

The first storage unit 14 includes a memory device such as a RAM or ROM, a fixed disk device such as a hard disk, or a removable storage device such as an optical disk. The first storage unit 14 stores a computer program, data base, table, etc., which are used by the image reading apparatus 10 to perform various processing operations. The computer program may be installed on the first storage unit 14 from a computer-readable, non-transitory medium such as a compact disk read only memory (CD-ROM), a digital versatile disk read only memory (DVD-ROM), or the like by using a well-known setup program or the like.

The first central processing unit 15 is connected to the image input unit 11, the first image memory unit 12, the first interface unit 13, the first storage unit 14, and the image processing unit 16, and controls these units. The first central processing unit 15 performs control operations such as the control of the input image generation by the image input unit 11, the control of the first image memory unit 12, the control of data transmission and reception to and from the information processing apparatus 20 via the first interface unit 13, the control of the first storage unit 14, and the control of the image processing by the image processing unit 16.

The image processing unit 16 is connected to the first image memory unit 12, and performs a decision process for deciding whether or not the input image contains a background element such as a background pattern and a binarization process for binarizing the input image. The image processing unit 16 is also connected to the first central processing unit 15 and performs processing operations under the control of the first central processing unit 15 in accordance with the program prestored in the first storage unit 14. Alternatively, the image processing unit 16 may be constructed from an independent integrated circuit, microprocessor, firmware, or the like.

The information processing apparatus 20 includes a second interface unit 21, a second image memory unit 22, a display unit 23, a second storage unit 24, and a second central processing unit 25. The various units constituting the information processing apparatus 20 will be described in detail below.

The second interface unit 21 includes an interface circuit similar to the one constituting the first interface unit 13 of the image reading apparatus 10, and connects the information processing apparatus 20 to the image reading apparatus 10.

The second image memory unit 22 includes a storage device similar to the one constituting the first image memory unit 12 of the image reading apparatus 10. The second image memory unit 22 stores the image data received from the image reading apparatus 10 via the second interface unit 21.

The display unit 23 includes a display, such as a liquid crystal display or an organic EL display, and an interface circuit which outputs image data to the display; the display unit 23 is connected to the second image memory unit 22 and displays the image data retrieved from the second image memory unit 22.

The second storage unit 24, similarly to the first storage unit 14 in the image reading apparatus 10, is constructed from a memory device, a fixed disk device, a portable storage device, etc. The second storage unit 24 stores a computer program, data base, table, etc., which are used by the information processing apparatus 20 to perform various processing operations. The computer program may be installed on the second storage unit 24 from a computer-readable, non-transitory medium such as a compact disk read only memory (CD-ROM), a digital versatile disk read only memory (DVD-ROM), or the like by using a well-known setup program or the like.

The second central processing unit 25 is connected to the second interface unit 21, the second image memory unit 22, the display unit 23, and the second storage unit 24, and controls these units. The second central processing unit 25 performs control operations such as the control of data transmission and reception to and from the image reading apparatus 10 via the second interface unit 21, the control of the second image memory unit 22, the display control for the display unit 23, and the control of the second storage unit 24.

Figure 2:
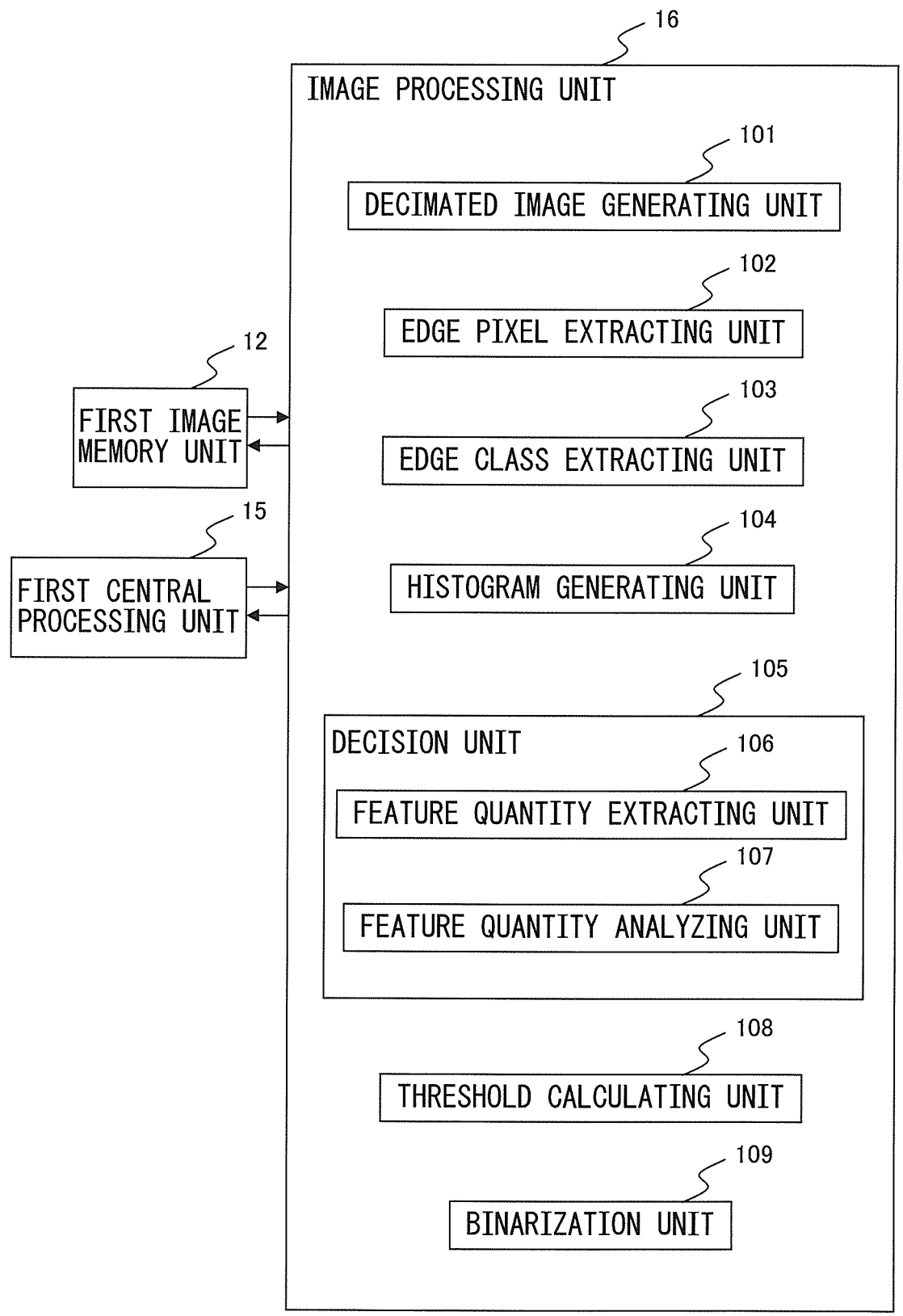
FIG. 2 is a diagram schematically illustrating the configuration of an image processing unit.

FIG. 2 is a diagram schematically illustrating the configuration of the image processing unit 16. As illustrated in FIG. 2, the image processing unit 16 includes a decimated image generating unit 101, an edge pixel extracting unit 102, an edge class extracting unit 103, a histogram generating unit 104, a decision unit 105, a threshold calculating unit 108, and a binarization unit 109. The decision unit 105 includes a feature quantity extracting unit 106 and a feature quantity analyzing unit 107.

Figure 3:
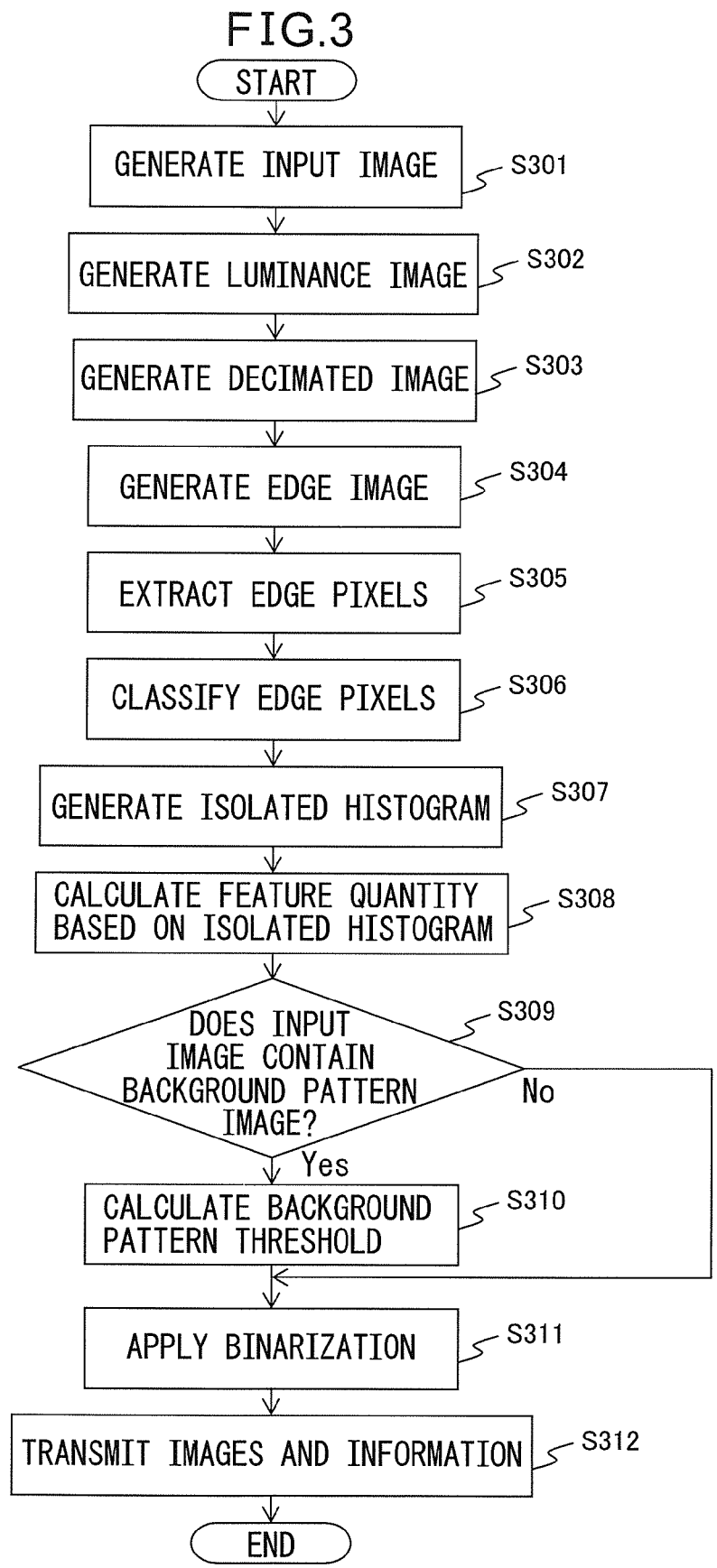
FIG. 3 is a flowchart illustrating the sequence of operations performed in an image reading apparatus to implement a decision process.

FIG. 3 is a flowchart illustrating the sequence of operations performed in the image reading apparatus 10 to implement the decision process for deciding whether or not the input image contains a background element such as a background pattern and the binarization process for binarization the input image. The sequence of operations for implementing the decision process and the binarization process will be described below with reference to the flowchart of FIG. 3. The operation flow described hereinafter is executed primarily by the first central processing unit 15 in collaboration with the various component elements of the image reading apparatus 10 in accordance with the program prestored in the first storage unit 14.

First, the image input unit 11 generates the input image by capturing an image of the subject (document), and stores the input image in the first image memory unit 12 (step S301).

Next, the decimated image generating unit 101 in the image processing unit 16 reads out the input image stored in the first image memory unit 12, generates a luminance image by converting the RGB value of each pixel in the input image into a luminance value, and stores the luminance image in the first image memory unit 12 (step S302). The luminance value can be calculated, for example, from the following equation.

$$\text{Luminance value} = 0.30 \times R \text{ value} + 0.59 \times G \text{ value} + 0.11 \times B \text{ value} \quad (1)$$

Next, the decimated image generating unit 101 generates a decimated image by decimating pixels in the luminance image horizontally and vertically, and stores the decimated image in the first image memory unit 12 (step S303).

Generally, an image of a background element such as a background pattern (the image being hereinafter referred to as the background pattern image) is composed of a graphical or pictorial pattern, characters, etc., and represented by image density values that are lower than the image density of the intended image such as characters (the intended image being hereinafter referred to as the real image). When the background pattern image is composed of a graphical or pictorial pattern or the like, the background pattern image tends to contain a larger number of oblique-line or curved-line components than the real image does, and when the background pattern image is composed of characters, the size of the characters tends to be smaller than the real image. As a result, when the pixels in the luminance image are decimated at equally spaced intervals in the horizontal and vertical directions, the pixels forming the decimated background pattern image, compared with those forming the real image, tend to be separated from each other and thus become discontinuous.

In view of this, the decimated image generating unit 101 decimates the pixels so that the decimated image will be formed from a predetermined number of pixels (for example, 640 pixels). Alternatively, the decimated image generating unit 101 may decimate the pixels in the input image at a predetermined rate in the horizontal and vertical directions (for example, 99% of the pixels are decimated). In this case, the number of pixels forming the decimated image varies depending on the size and resolution of the input image.

Figure 4:
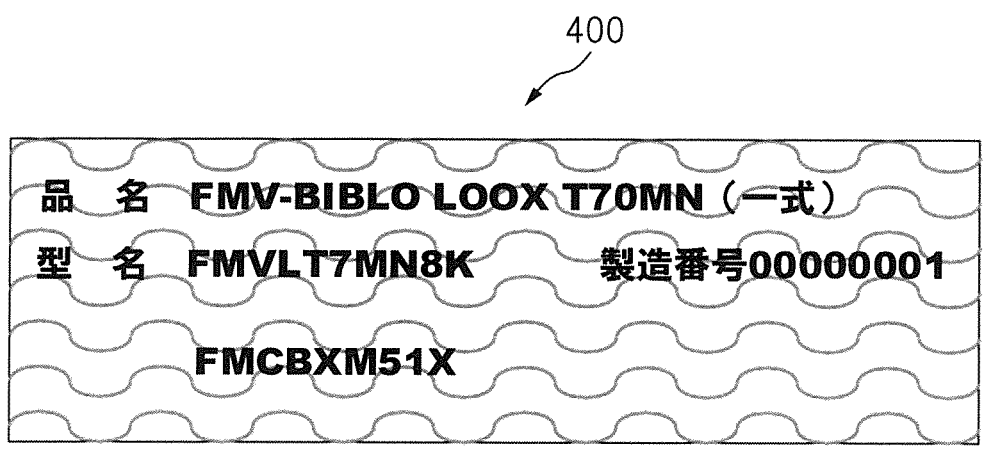
FIG. 4 is a diagram showing an example of a luminance image generated by a decimated image generating unit.

FIG. 4 shows an example of the luminance image generated in step S302. In the luminance image of FIG. 4, the real image shows characters indicating a product name, etc., and the background pattern image shows a wave pattern whose image density is lower than that of the real image.

Figure 5:
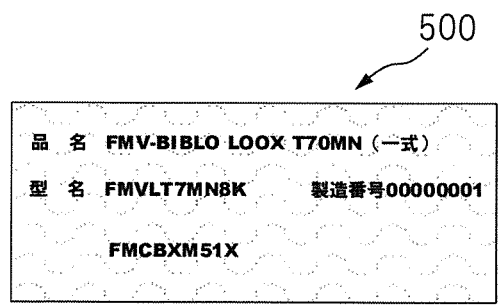
FIG. 5 is a diagram showing a decimated image generated based on the luminance image shown in FIG. 4.

FIG. 5 shows the decimated image generated in step S303 from the luminance image shown in FIG. 4. As shown in FIG. 5, in the decimated image 500, unlike the luminance image shown in FIG. 4, the pixels forming the wave pattern are separated from each other and thus become discontinuous.

Next, the edge pixel extracting unit 102 reads out the decimated image stored in the first image memory unit 12, applies edge detection filtering such as second-order differential filtering to each pixel in the decimated image, and generates an edge image by taking each output value as a pixel value (step S304). An example of the second-order differential filtering applied by the edge pixel extracting unit 102 is shown below.

[MATHEMATICAL 1]

$$\text{second-order differential filtering} = \begin{bmatrix} -1 & -1 & -1 \\ -1 & 8 & -1 \\ -1 & -1 & -1 \end{bmatrix} \quad (2)$$

Since the output value of the second-order differential filtering tends to be strongly affected by noise, the edge pixel extracting unit 102 may reduce the effect of noise by further applying smoothing filtering such as median filtering or Gaussian filtering to each pixel in the edge image.

Next, the edge pixel extracting unit 102 extracts edge pixels from the decimated image by using the edge image (step S305).

Figure 6A:
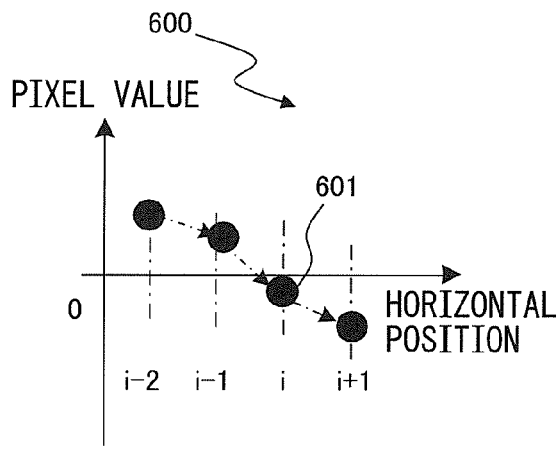
FIG. 6A is a schematic diagram for explaining edge pixel extraction.
Figure 6C:
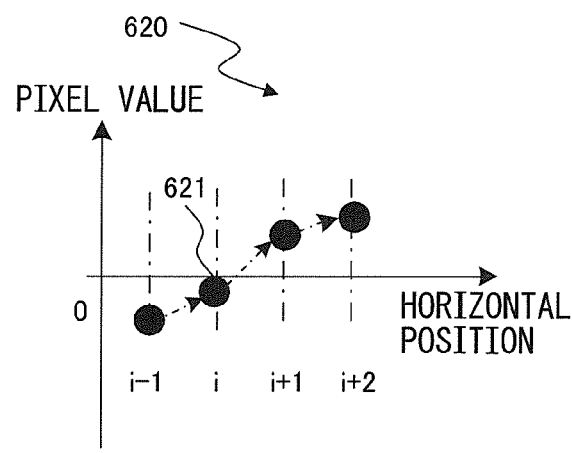
FIG. 6C is a schematic diagram for explaining edge pixel extraction.
Figure 6B:
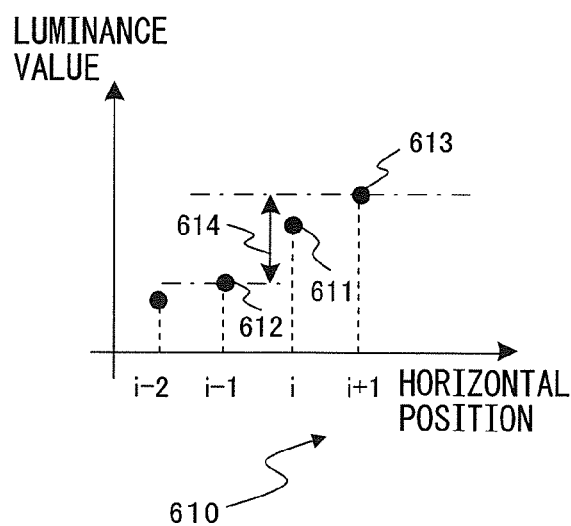
FIG. 6B is a schematic diagram for explaining edge pixel extraction.
Figure 6D:
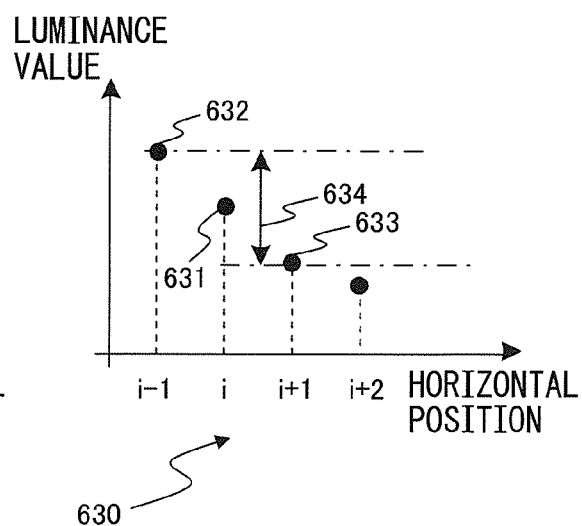
FIG. 6D is a schematic diagram for explaining edge pixel extraction.

FIGS. 6A to 6D are diagrams for explaining the edge pixel extraction. Graphs 600 and 620 in FIGS. 6A and 6C show the pixel values of horizontally adjacent pixels in the edge image, and graphs 610 and 630 in FIGS. 6B and 6D show the luminance values of the pixels in the decimated image that correspond to the respective pixels in the edge image. The abscissa in each of the graphs 600 and 620 represents the horizontal position on the edge image, and the ordinate represents the pixel value. On the other hand, the abscissa in each of the graphs 610 and 630 represents the horizontal position on the decimated image, and the ordinate represents the luminance value.

First, from among the horizontally adjacent pixels in the edge image each of whose pixel values changes sign from positive to negative or from negative to positive, the edge pixel extracting unit 102 extracts pixels 601 and 621 whose pixel values are negative. Next, the edge pixel extracting unit 102 calculates absolute differences 614 and 634 (each hereinafter referred to as the adjacent pixel difference value), the former representing the absolute difference in luminance value between the pixels 612 and 613 horizontally adjacent on both sides of the pixel 611 in the decimated image and the latter the absolute difference in luminance value between the pixels 632 and 633 horizontally adjacent on both sides of the pixel 631 in the decimated image, the pixels 611 and 631 corresponding to the extracted edge pixels 601 and 621, respectively. Then, the edge pixel extracting unit 102 determines whether the thus calculated adjacent pixel difference value exceeds a threshold value Wth and, if the adjacent pixel difference value exceeds the threshold value Wth, then extracts the corresponding pixel in the decimated image as a horizontal edge pixel. The threshold value Wth here may be set, for example, equal to the minimum difference in luminance value (for example, to 20) with which the human eye can perceive a difference in luminance on the image. The edge pixel extracting unit 102 also extracts vertical edge pixels by performing processing operations, similar to those described above, in the vertical direction across the edge image and the decimated image. Then, the edge pixel extracting unit 102 determines that any pixel detected as either a horizontal edge pixel or a vertical edge pixel is an edge pixel. Alternatively, any pixel detected as both a horizontal edge pixel and a vertical edge pixel may be determined as an edge pixel.

Next, the edge class extracting unit 103 classifies the edge pixels extracted by the edge pixel extracting unit 102 into two classes: isolated edge pixels which have no neighboring edge pixels, and connected edge pixels which have neighboring edge pixels (step S306).

Figure 7:
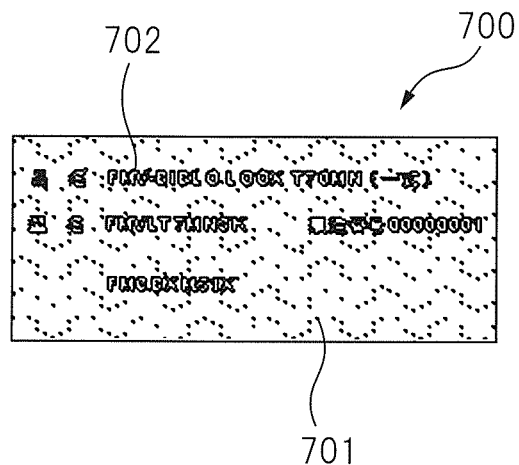
FIG. 7 is a diagram showing an image constructed by plotting edge pixels.

FIG. 7 shows an image constructed by plotting the edge pixels extracted in step S305 from the decimated image 500 shown in FIG. 5. As shown in the image 700 of FIG. 7, each edge pixel is extracted at an edge portion across which the luminance changes between its neighboring pixels in the real image or the background pattern image. Since these edge pixels are extracted from the decimated image, an edge pixel 701 extracted at an edge in the background pattern image tends to be isolated (no edge pixels are contained in a set of pixels neighboring the extracted edge pixel). On the other hand, an edge pixel 702 extracted at an edge in the real image tends to be connected (an edge pixel is contained in a set of pixels neighboring the extracted edge pixel). Therefore, the edge class extracting unit 103 classifies an edge pixel having no neighboring edge pixels as an isolated edge pixel and an edge pixel having a neighboring edge pixel as a connected edge pixel.

Figure 8:
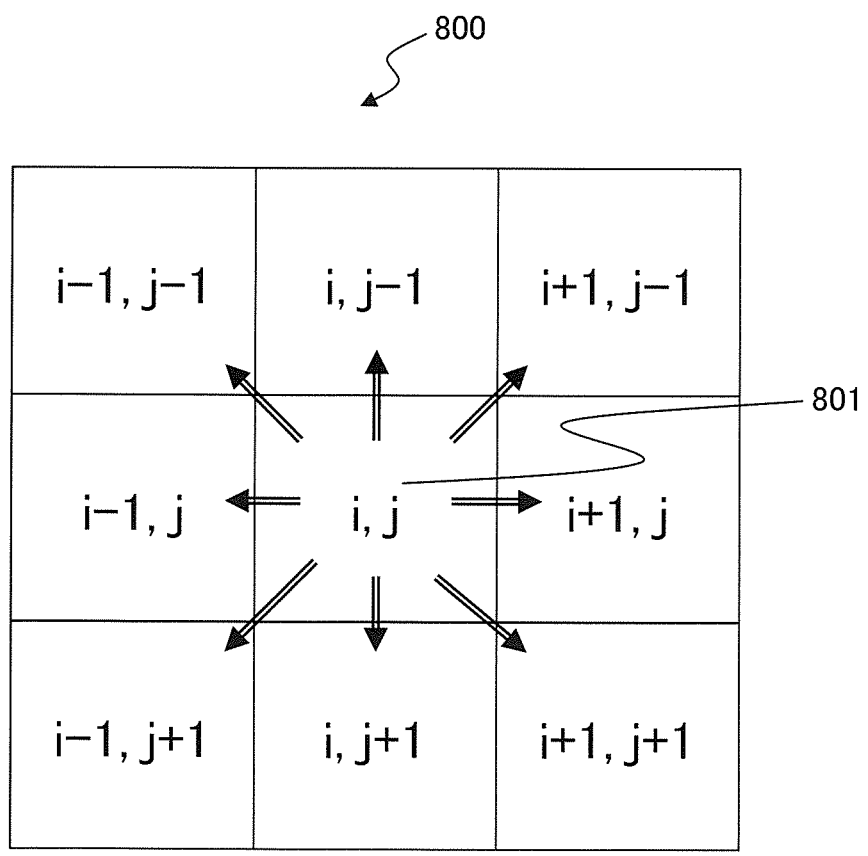
FIG. 8 is a schematic diagram for explaining neighboring pixels.

FIG. 8 is a schematic diagram for explaining the neighboring pixels. As illustrated in FIG. 8, the edge class extracting unit 103 checks to see whether an edge pixel is contained in a set of eight pixels horizontally, vertically, and diagonally neighboring an edge pixel 801 of interest taken from an image 800. If the edge pixel 801 does not have any neighboring edge pixel, the edge class extracting unit 103 classifies the edge pixel 801 as an isolated edge pixel; on the other hand, if the edge pixel 801 has a neighboring edge pixel, the edge class extracting unit 103 classifies the edge pixel 801 as a connected edge pixel. Alternatively, the edge class extracting unit 103 may classify the edge pixel 801 as an isolated edge pixel if, of its neighboring pixels, the number of pixels that are not edge pixels is not less than a predetermined number (for example, two), and may classify the edge pixel 801 as a connected edge pixel if, of its neighboring pixels, the number of pixels that are edge pixels is not less than the predetermined number.

Next, the histogram generating unit 104 generates a histogram of the horizontally adjacent pixel difference values and vertically adjacent pixel difference values for the isolated edge pixels extracted from the decimated image (step S307) (this histogram will hereinafter be referred to as the isolated histogram).

Figure 9A:
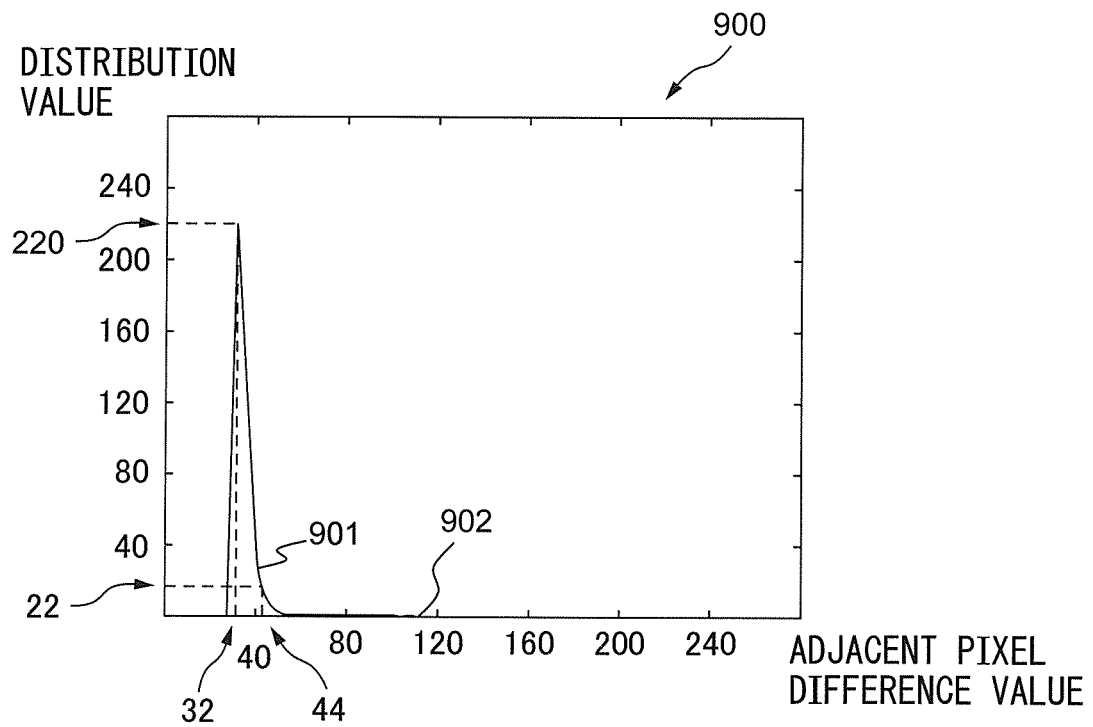
FIG. 9A is a diagram showing an example of an isolated histogram.
Figure 9B:
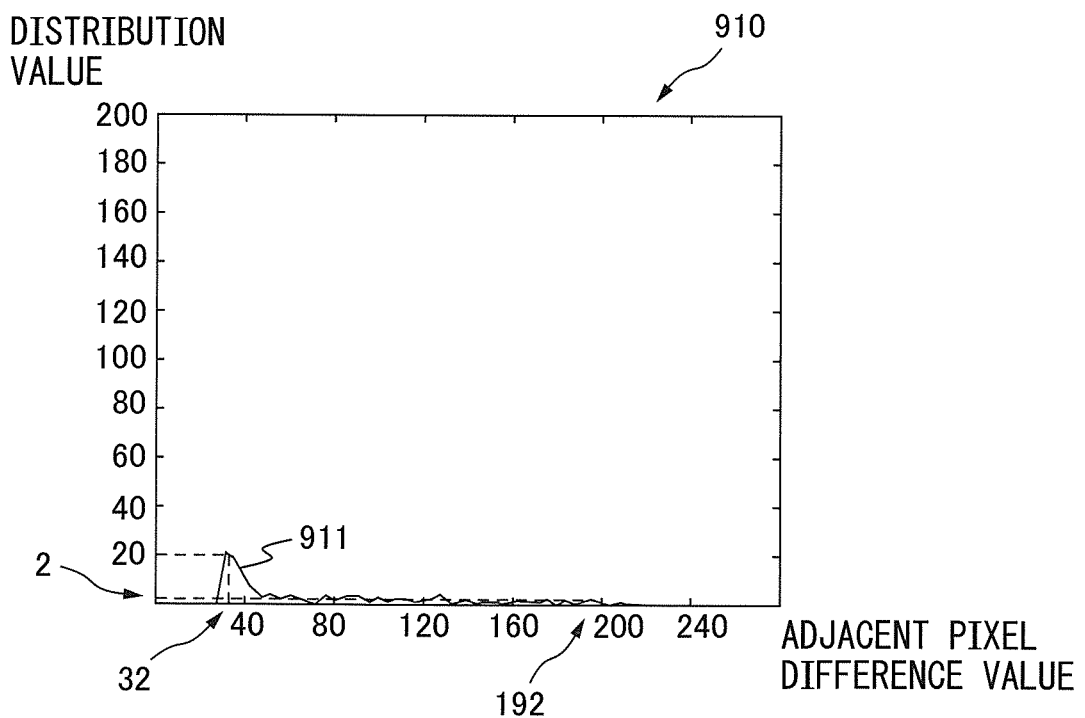
FIG. 9B is a diagram showing an example of an isolated histogram.

FIGS. 9A and 9B are diagrams each showing an example of the isolated histogram. In FIGS. 9A and 9B, the abscissa represents the adjacent pixel difference value for each edge pixel in the decimated image, and the ordinate represents the distribution value (distribution number) of the isolated histogram. Graph 900 in FIG. 9A shows the isolated histogram 901 generated when the input image contains a background pattern image, while graph 910 in FIG. 9B shows the isolated histogram 911 generated when the input image does not contain any background pattern image.

Next, based on the isolated histogram generated by the histogram generating unit 104, the feature quantity extracting unit 106 in the decision unit 105 calculates a feature quantity for determining whether or not the input image contains a background pattern image (step S308).

Most isolated edge pixels are extracted along the boundaries between the background pattern image and the plain background area. On the other hand, the background pattern image and the plain background area generally have respectively different but constant luminance values. As a result, the isolated histogram 901 generated for the input image that contains such a background pattern image tends to have only one extreme value near the value representing the difference between the luminance value of the background pattern image and the luminance value of the plain background area, and tends to converge quickly, as illustrated in FIG. 9A.

In view of this, the feature quantity extracting unit 106 obtains the number of extreme values appearing in the distribution value of the isolated histogram and the rate of convergence of the isolated histogram as the feature quantity for determining whether or not the input image contains a background pattern image. The rate of convergence of the isolated histogram (hereinafter referred to as the convergence rate) refers to the speed with which the distribution value of the isolated histogram converges within a predetermined range, that is, the spread of the range of adjacent pixel difference values over which the distribution value of the isolated histogram is made to converge to or below a predetermined value.

For example, when the distribution value at a given adjacent pixel difference value in the isolated histogram is larger than the distribution values at the adjacent pixel difference values on both sides of it, the feature quantity extracting unit 106 determines that the distribution value at that given adjacent pixel difference value is an extreme value. Alternatively, the distribution value may be determined as an extreme value when it is larger than the distribution values at the adjacent pixel difference values on both sides of it by not less than a predetermined percentage (for example, by not less than 10% of the distribution value at the given adjacent pixel difference value).

Further, the feature quantity extracting unit 106 obtains the convergence rate, based on the spread of the range over which the distribution value of the histogram is not less than a predetermined percentage of its maximum value. For example, the feature quantity extracting unit 106 obtains the convergence rate by taking the reciprocal of the absolute difference between the adjacent pixel difference value at which the distribution value of the isolated histogram exhibits the maximum value and the adjacent pixel difference value at or above which the distribution value of the isolated histogram becomes equal to or smaller than a predetermined percentage Th0 of the maximum value. The predetermined percentage Th0 here may be set, for example, to 10%. Alternatively, the feature quantity extracting unit 106 may obtain the convergence rate, based on the spread of the entire range over which the distribution value of the isolated histogram is not less than the predetermined percentage Th0 of its maximum value. In this case, the feature quantity extracting unit 106 obtains the convergence rate, for example, by taking the reciprocal of the absolute difference between the largest adjacent pixel difference value and the smallest adjacent pixel difference value among the adjacent pixel difference values at which the distribution value of the isolated histogram is equal to or larger than the predetermined percentage Th0 of its maximum value. Further, the feature quantity extracting unit 106 may obtain the convergence rate of the histogram after reducing the effects of noise by applying smoothing filtering such as median filtering or Gaussian filtering to the histogram generated by the histogram generating unit 104.

Next, based on the feature quantity of the isolated histogram calculated by the feature quantity extracting unit 106, the feature quantity analyzing unit 107 in the decision unit 105 make a decision as to whether or not the input image contains a background pattern image, and stores the result of the decision in the first image memory unit 12 (step S309).

The feature quantity analyzing unit 107 decides that the input image contains a background pattern image, if the number of extreme values in the isolated histogram is one and if the convergence rate of the isolated histogram is not less than a threshold ThD. On the other hand, if the number of extreme values in the isolated histogram is not one, or if the convergence rate of the isolated histogram is less than the threshold ThD, the feature quantity analyzing unit 107 decides that the input image does not contain a background pattern image. The threshold ThD here may be set, for example, to 1/20.

In the example shown in FIG. 9A, the maximum distribution value of the isolated histogram 901 is 220, and the adjacent pixel difference value corresponding to this maximum value is 32. On the other hand, the distribution value becomes equal to or less than 22, i.e., 10% of the maximum value, when the adjacent pixel difference value is 44 or larger. In this case, the convergence rate is 1/12 which is the reciprocal of the absolute difference between the adjacent pixel difference value of 32 and the adjacent pixel difference value of 44; since this convergence rate is larger than the threshold ThD (1/20), it is decided that the input image contains a background pattern image.

On the other hand, in the example shown in FIG. 9B, the maximum distribution value of the isolated histogram 911 is 20, and the adjacent pixel difference value corresponding to this maximum value is 32. On the other hand, the distribution value becomes equal to or less than 2, i.e., 10% of the maximum value, when the adjacent pixel difference value is 192 or larger. In this case, the convergence rate is 1/160 which is the reciprocal of the absolute difference between the adjacent pixel difference value of 32 and the adjacent pixel difference value of 192; since this convergence rate is less than the threshold ThD, it is decided that the input image does not contain a background pattern image.

The feature quantity analyzing unit 107 may decide that the input image does not contain a background pattern image, if the number of extreme values in the isolated histogram is not less than a predetermined number (for example, two or more). Alternatively, the feature quantity analyzing unit 107 may make a decision as to whether or not the input image contains a background pattern image, based only on the convergence rate of the isolated histogram without regard to the number of extreme values contained in the isolated histogram.

If it is decided by the feature quantity analyzing unit 107 in step S309 that the input image contains a background pattern image, the threshold calculating unit 108 calculates a threshold value (hereinafter referred to as the background pattern threshold) used for binarizing the luminance image, and stores the threshold value in the first image memory unit 12 (step S310).

The calculation of the background pattern threshold will be described below. The threshold calculating unit 108 obtains as the background pattern threshold the adjacent pixel difference value at which the distribution value of the isolated histogram converges to 0. In the isolated histogram 901 shown in FIG. 9A, the adjacent pixel difference value at point 902 where the distribution value converges to 0 is taken as the background pattern threshold. Alternatively, the threshold calculating unit 108 may take as the background pattern threshold the adjacent pixel difference value at which the distribution value of the isolated histogram converges to or below a predetermined value (for example, 10% of the maximum distribution value).

If it is decided in step S309 that the input image does not contain a background pattern image, or after the background pattern threshold has been calculated in step S310), the binarization unit 109 reads out the luminance image stored in the first image memory unit 12, binarizes the luminance image, and stores the binarized image in the first image memory unit 12 (step S311).

Next, the binarization process will be described. If the input image contains a background pattern image, the binarization unit 109 must remove the background image and extract the real image from the luminance image by applying binarization to the luminance image. As described above, the background pattern threshold is determined based on the adjacent pixel difference value of the isolated edge pixel, i.e., the difference between the luminance value of the background pattern image and the luminance value of the plain background area. Accordingly, if the horizontal or vertical adjacent pixel difference value in the luminance image exceeds the background pattern threshold, it may be determined that an edge due to the presence of a pixel having a higher luminance value than the background pattern image, i.e., an edge due to the presence of the real image, exits in that region.

Then, the binarization unit 109 calculates the horizontal and vertical adjacent pixel difference values for each pixel in the luminance image, and determines whether one or the other of the thus calculated adjacent pixel difference values exceeds the background pattern threshold. Next, for the pixels (hereinafter referred to as the neighboring pixels) located within a predetermined range of the pixel one or the other of whose adjacent pixel difference values exceeds the background pattern threshold, the binarization unit 109 determines a binarization threshold (hereinafter referred to as the dynamic threshold) based on the luminance value of each of the neighboring pixels, and performs binarization using the dynamic threshold. The binarization unit 109 determines the dynamic threshold by taking, for example, the average luminance value of the neighboring pixels. Alternatively, the dynamic threshold may be determined by taking the average value between the maximum and minimum luminance values of the neighboring pixels or the median value of the luminance values of the neighboring pixels.

On the other hand, for the pixels other than the neighboring pixels, the binarization unit 109 determines a binarization threshold (hereinafter referred to as the static threshold) based on the luminance values of all the pixels in the luminance image, and performs binarization using the static threshold. The binarization unit 109 determines the static threshold by taking, for example, the average luminance value of all the pixels contained in the luminance image. Alternatively, the static threshold may be determined by taking the average value between the maximum and minimum luminance values of all the pixels contained in the luminance image or the median value of the luminance values of all the pixels contained in the luminance image. Alternatively, the binarization unit 109 may perform binarization so that all the pixels other than the neighboring pixels are binarized to 0 or 1.

If the input image does not contain a background pattern image, the binarization unit 109 sets the static threshold, and applies binarization to all the pixels in the luminance image by using the static threshold.

Next, the first central processing unit 15 retrieves the input image, decision result information, and binarized image from the first image memory unit 12, and transmits them to the information processing apparatus 20 via the first interface unit 13 (step S312), thus terminating the series of steps.

If it is determined by the feature quantity analyzing unit 107 that the input image contains a background pattern image, the first central processing unit 15 transmits the background pattern threshold to the information processing apparatus 20 in addition to the input image, decision result information, and binarized image.

In the information processing apparatus 20, when the input image, decision result information, and binarized image, or the background pattern threshold in addition to them, transmitted from the image reading apparatus 10, are received via the second interface unit 21, the second central processing unit 25 stores the received images and information in the second image memory unit 22 by associating them with each other. In this way, a data base of input images and binarized images classifiable by the decision result information or background pattern threshold is constructed in the second image memory unit 22. Further, the second central processing unit 25 displays the input image and the binarized image on the display unit 23 by associating them with each other so that the user can visually check the images.

Further, the second central processing unit 25 may sort the input images based on the decision result information or the background pattern threshold. Then, the information processing apparatus 20 can sort documents such as financial forms with high accuracy. Furthermore, provisions may be made for the second central processing unit 25 to read the characters from the binarized image and convert them to character data. Then, the information processing apparatus 20 can extract the character data with high accuracy from the binarized image from which the background pattern image has been removed. Alternatively, an external device such as a sorting device or an OCR device may be connected to the second interface unit 21 of the information processing apparatus 20, and the images and information may be transmitted to such an external device. In this way, processing such as sorting of input images and character reading can be performed using the external sorting device, OCR device, etc.

As described in detail above, by operating the image reading apparatus 10 in accordance with the flowchart of FIG. 3, it is possible to accurately extract the isolated edge pixels corresponding to the edges of the background pattern image, and to determine with high accuracy whether or not the input image contains a background element, based on the luminance difference between the adjacent pixels of each isolated edge pixel.

Figure 10:
FIG. 10 is a diagram showing a binarized image generated by binarization in accordance with the flowchart of FIG. 3.

FIG. 10 shows one example of a binarized image generated by binarizing the luminance image 400 of FIG. 4 in accordance with the flowchart of FIG. 3. The image reading apparatus 10 extracts isolated edge pixels corresponding to the boundaries between the wave pattern area and the plain background area from the decimated image generated based on the luminance image 400 and determines, based on the isolated histogram of the isolated edge pixels, that the input image contains a background pattern image. Then, the image reading apparatus 10 generates the binarized image 1000 by setting the background pattern threshold and binarization threshold so as to extract the character area while removing the wave pattern area from the luminance image 400.

Figure 11:
FIG. 11 is a diagram showing a binarized image generated by binarization using a predetermined binarization threshold.

FIG. 11 shows one example of a binarized image generated by binarizing the luminance image 400 of FIG. 4 using a predetermined binarization threshold. If the binarization threshold is smaller than the luminance value of the wave pattern area, the result is the generation of the binarized image 1000 in which the wave pattern area remains unremoved, as shown in FIG. 11.

Figure 12A:
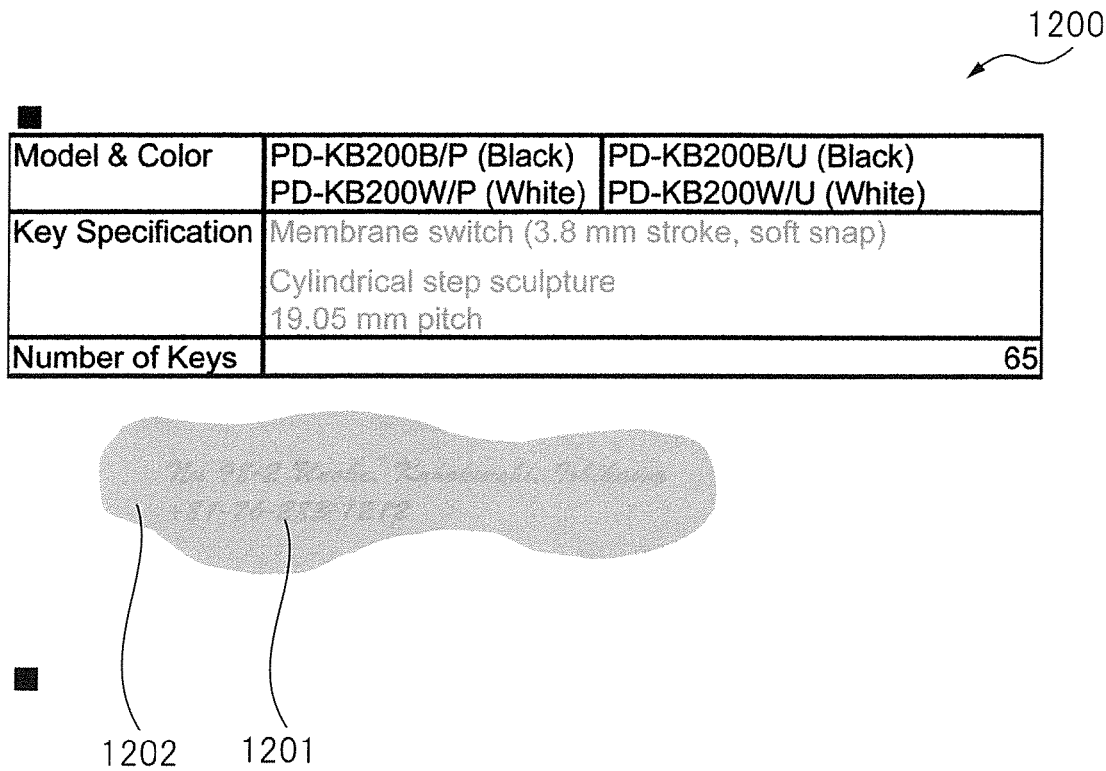
FIG. 12A is a diagram showing an input image.
Figure 12B:
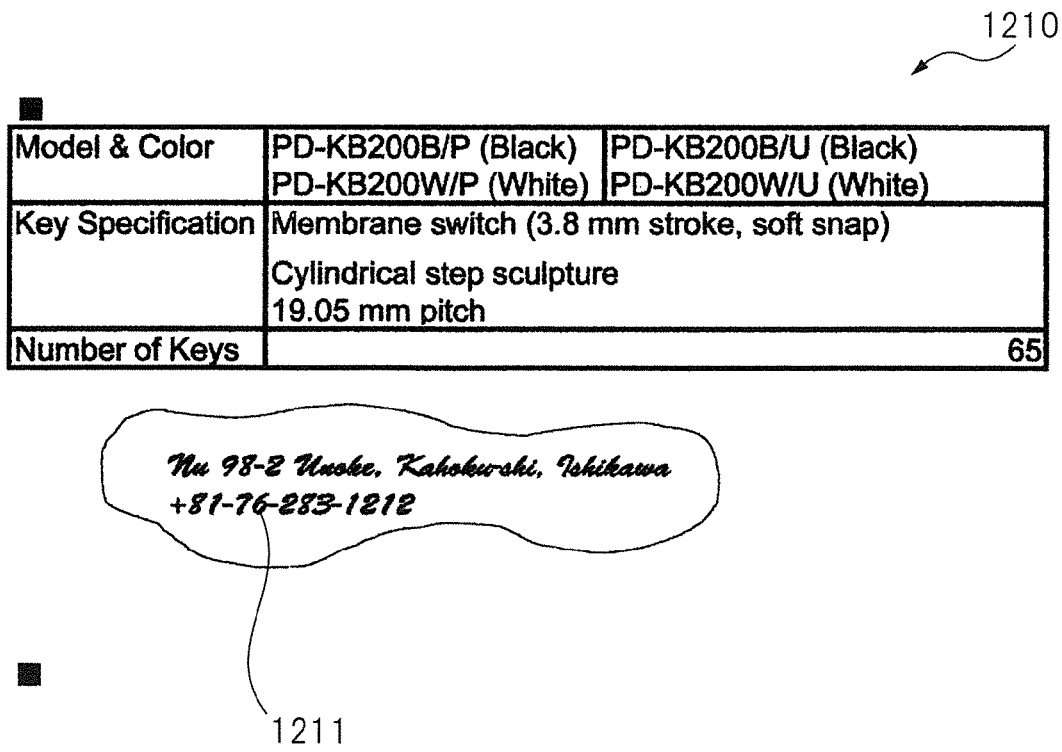
FIG. 12B is a diagram showing a binarized image.

FIG. 12A shows one example of another input image, and FIG. 12B shows a binarized image generated by binarizing the luminance image generated based on this input image. The input image 1200 of FIG. 12A shows a hardly visible handwritten note 1201 because of its low density and the fluorescent color 1202 applied over it by a fluorescent marker. The image reading apparatus 10 extracts isolated edge pixels corresponding to the boundaries between the fluorescent color 1202 and the plain background area from the decimated image generated based on this input image 1200 and determines, based on the isolated histogram of the isolated edge pixels, that the input image contains a background pattern image. Then, the image reading apparatus 10 generates the binarized image 1210 by setting the background pattern threshold and binarization threshold so as to extract the handwritten note 1201 while removing the fluorescent color 1202 applied over it from the luminance image. In this way, the image reading apparatus 10 can correctly extract the real image such as characters even when the real image in the input image is shaded or is applied with a color.

FIG. 13 is a flowchart illustrating another example of the sequence of operations for implementing the decision process and the binarization process. The sequence of operations for implementing the decision process and the binarization process according to this example will be described below with reference to the flowchart of FIG. 13. This flowchart can be carried out by the image reading apparatus 10 of FIG. 1 in place of the flowchart earlier illustrated in FIG. 3. The operation flow described hereinafter is executed primarily by the first central processing unit 15 in collaboration with the various component elements of the image reading apparatus 10 in accordance with the program prestored in the first storage unit 14.

The flowchart of FIG. 13 differs from the flowchart of FIG. 3 in that the image reading apparatus 10 determines whether or not the input image contains a background pattern image, based on the interrelationship between the convergence rate of the isolated histogram and the convergence rate of a histogram of the connected edge pixels. Which convergence rate is higher between the convergence rate of the isolated histogram and the convergence rate of the connected edge pixel histogram is the interrelationship. The process performed in steps S1301 to S1306 and S1310 to S1312 in FIG. 13 is the same as the process performed in steps S301 to S306 and S310 to S312 in FIG. 3, and therefore will not be further described herein. Only the process performed in steps S1307 to S1309 will be described below.

In step S1307, the histogram generating unit 104 generates, in addition to the isolated histogram, a histogram of the horizontally adjacent pixel difference values and vertically adjacent pixel difference values for the connected edge pixels extracted from the decimated image (this histogram will hereinafter be referred to as the connected histogram).

Figure 14A:
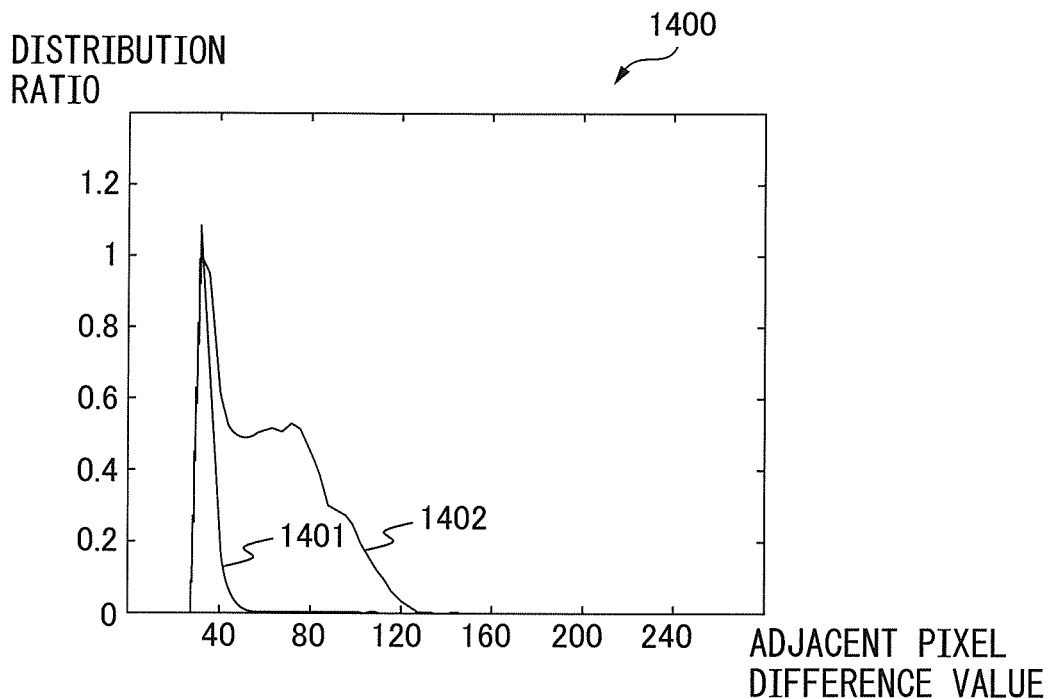
FIG. 14A is a diagram showing examples of an isolated histogram and a connected histogram.
Figure 14B:
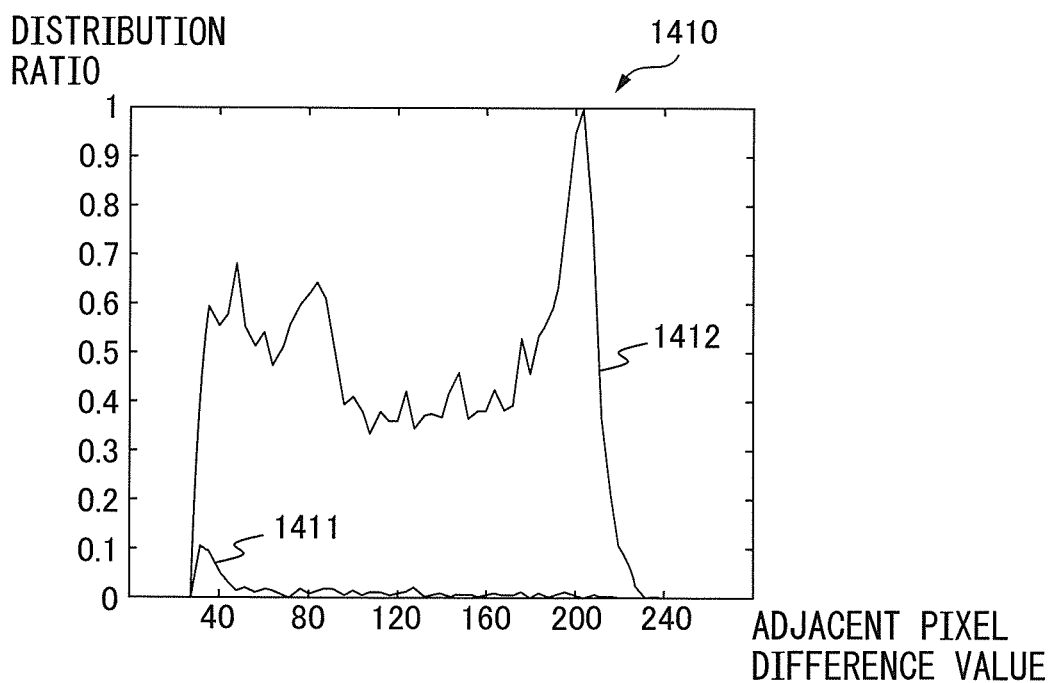
FIG. 14B is a diagram showing examples of an isolated histogram and a connected histogram.

FIGS. 14A and 14B are diagrams showing examples of the isolated histogram and the connected histogram. In FIGS. 14A and 14B, the abscissa represents the adjacent pixel difference value for each edge pixel in the decimated image, and the ordinate represents the distribution ratio in each histogram normalized so that the maximum distribution value of the connected histogram is 1. Graph 1400 in FIG. 14A shows the isolated histogram 1401 and connected histogram 1402 generated when the input image contains a background pattern image, while graph 1410 in FIG. 14B shows the isolated histogram 1411 and connected histogram 1412 generated when the input image does not contain any background pattern image.

Next, based on the isolated histogram and the connected histogram generated by the histogram generating unit 104, the feature quantity extracting unit 106 calculates the feature quantity for determining whether or not the input image contains a background pattern image (step S1308).

Most connected edge pixels are extracted along the edges of the real image or the background pattern image. That is, most of the adjacent pixel difference values calculated for the connected edge pixels represent either the difference between the luminance value of the real image and the luminance value of the plain background area, or the difference between the luminance value of the background pattern image and the luminance value of the plain background area, or the difference between the luminance value of the real image and the luminance value of the background pattern image. Accordingly, the connected histogram 1402 generated for the input image containing a background pattern image is spread over a wide range, as illustrated in FIG. 14A. More specifically, the connected histogram 1402 has more than one extreme value, and its convergence rate tends to be lower than that of the isolated histogram 1401. Therefore, the feature quantity extracting unit 106 calculates the convergence rate of the connected histogram, as well as the convergence rate of the isolated histogram, to obtain the feature quantity for determining whether or not the input image contains a background pattern image. The calculation of the convergence rate has been described in detail in step S308 in the flowchart of FIG. 3, and therefore, the description will not be repeated here.

Next, the feature quantity analyzing unit 107 makes a decision as to whether or not the input image contains a background pattern image, based on whether the convergence rate of the isolated histogram is not lower than the convergence rate of the connected histogram, and stores the result of the decision in the first image memory unit 12 (step S1309).

If the convergence rate of the isolated histogram is not lower than the convergence rate of the connected histogram, the feature quantity analyzing unit 107 decides that the input image contains a background pattern image; on the other hand, if the convergence rate of the isolated histogram is lower than the convergence rate of the connected histogram, the feature quantity analyzing unit 107 decides that the input image does not contain a background pattern image.

As described in detail above, by operating the image reading apparatus 10 in accordance with the flowchart of FIG. 13, it is possible to determine with high accuracy whether or not the input image contains a background element, based on the interrelationship between the distribution of the isolated edge pixels and the distribution of the connected edge pixels.

FIG. 15 is a flowchart illustrating another example of the sequence of operations for implementing the decision process and the binarization process. The sequence of operations for implementing the decision process and the binarization process according to this example will be described below with reference to the flowchart of FIG. 15. This flowchart can be carried out by the image reading apparatus 10 of FIG. 1 in place of the flowchart earlier illustrated in FIG. 3 or 13. The operation flow described hereinafter is executed primarily by the first central processing unit 15 in collaboration with the various component elements of the image reading apparatus 10 in accordance with the program prestored in the first storage unit 14.

The flowchart of FIG. 15 differs from the flowchart of FIG. 13 in that the image reading apparatus 10 determines whether or not the input image contains a background pattern image, based on the interrelationship between the maximum distribution value of the isolated histogram and the maximum distribution value of the connected histogram. This interrelationship is defined by determining whether the ratio of the maximum distribution value of the isolated histogram to the maximum distribution value of the connected histogram is less than or not less than a predetermined ratio. The process performed in steps S1501 to S1507 and S1510 to S1512 in FIG. 15 is the same as the process performed in steps S1301 to S1307 and S1310 to S1312 in FIG. 13, and therefore will not be further described herein. Only the process performed in steps S1508 and S1509 will be described below.

In step S1508, the feature quantity extracting unit 106 calculates the feature quantity for determining whether or not the input image contains a background pattern image.

It is believed that the background pattern image generally accounts for not less than a prescribed percentage of the total area of the input image, and it is also believed that the number of isolated edge pixels extracted along the edges of the background pattern image from the decimated image is generally not less than a prescribed number. In view of this, the feature quantity extracting unit 106 obtains the ratio of the maximum distribution value of the isolated histogram to the maximum distribution value of the connected histogram (hereinafter referred to as the maximum distribution ratio) as the feature quantity for determining whether or not the input image contains a background pattern image.

Next, the feature quantity analyzing unit 107 makes a decision as to whether or not the input image contains a background pattern image, based on whether the maximum distribution ratio is less than or not less than a predetermined ratio $D_H$ (step S1509). If the maximum distribution ratio is not less than the predetermined ratio $D_H$, the feature quantity analyzing unit 107 decides that the input image contains a background pattern image; on the other hand, if the maximum distribution ratio is less than the predetermined ratio $D_H$, the feature quantity analyzing unit 107 decides that the input image does not contain a background pattern image. This predetermined ratio $D_H$ may be set, for example, to 30%.

Alternatively, the ratio of the maximum distribution value of the isolated histogram to the number of pixels taken over the entire decimated image may be chosen as the feature quantity for determining whether or not the input image contains a background pattern image. In this case, if the ratio of the maximum distribution value of the isolated histogram to the number of pixels taken over the entire decimated image is not less than a predetermined ratio $D_{H2}$, it is decided that the input image contains a background pattern image; on the other hand, if the ratio is less than the predetermined ratio $D_{H2}$, it is decided that the input image does not contain a background pattern image. This predetermined ratio $D_{H2}$ may be set, for example, to 10%.

As described in detail above, by operating the image reading apparatus 10 in accordance with the flowchart of FIG. 15, it is possible to determine with high accuracy whether or not the input image contains a background element, based on the number of isolated edge pixels.

The feature quantity analyzing unit 107 may make a decision as to whether or not the input image contains a background pattern image by suitably combining the above conditions, i.e., the number of extreme values contained in the isolated histogram, the convergence rate of the isolated histogram, the relationship between the convergence rate of the isolated histogram and the convergence rate of the connected histogram, and the maximum distribution ratio. In this case, the feature quantity analyzing unit 107 decides that the input image contains a background pattern image if all the above conditions are satisfied, and decides that the input image does not contain a background pattern image if any one of the above conditions is not satisfied; by so doing, the presence or absence of a background pattern image can be determined with higher accuracy.

Figure 16:
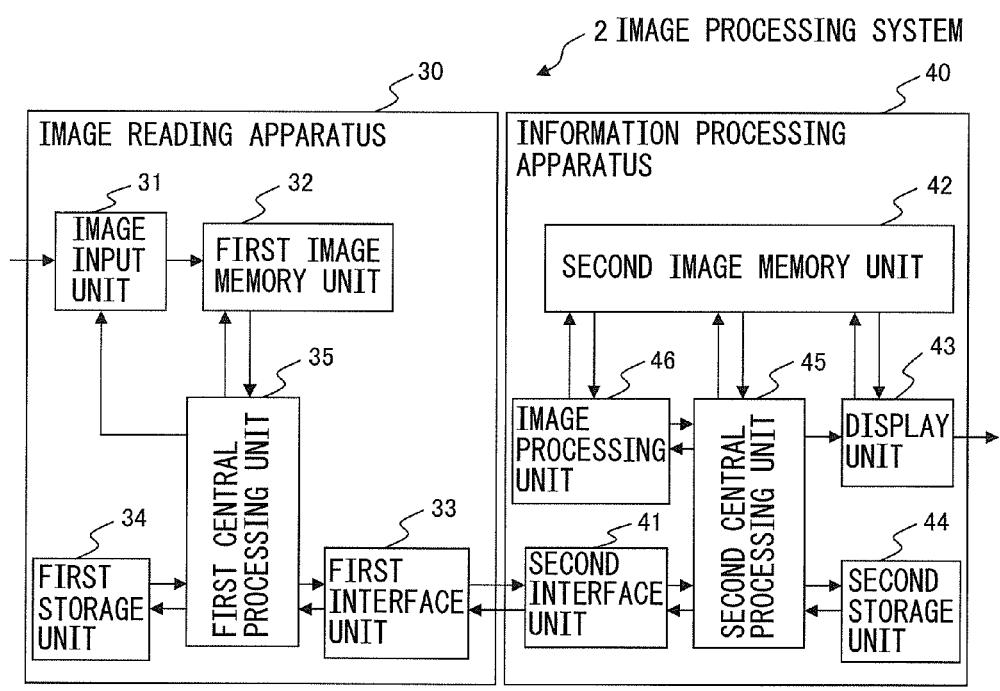
FIG. 16 is a diagram schematically illustrating the configuration of an alternative image processing system.

FIG. 16 is a diagram schematically illustrating the configuration of an alternative image processing system 2. The image processing system 2 of FIG. 16 differs from the image processing system 1 of FIG. 1 in that the apparatus equipped with the image processing unit is different. More specifically, in the image processing system 2, the information processing apparatus 40, not the image reading apparatus 30, is equipped with the image processing unit 46. The image processing unit 46 is identical in function to the image processing unit 16 contained in the image reading apparatus 10 of FIG. 1.

The image processing system 2 of FIG. 16 can implement substantially the same process as that illustrated in FIG. 3, 13, or 15. The following describes how the process illustrated in the flowchart of FIG. 3 is applied here. In the image processing system 2, the process of step S301 is executed primarily by the first central processing unit 35 in collaboration with the various component elements of the image reading apparatus 30 in accordance with the program prestored in the first storage unit 34, and the process of steps S302 to S311 is executed primarily by the second central processing unit 45 in collaboration with the various component elements of the information processing apparatus 40 in accordance with the program prestored in the second storage unit 44.

In step S301, the image input unit 31 in the image reading apparatus 30 generates an input image and stores it in the first image memory unit 32, and the first central processing unit 35 transmits the input image via the first interface unit 33 to the information processing apparatus 40. On the other hand, in the information processing apparatus 40, when the input image transmitted from the image reading apparatus 30 is received via the second interface unit 41, the second central processing unit 45 stores the received input image in the second image memory unit 42.

The process of steps S302 to S311 is carried out by the image processing unit 46 in the information processing apparatus 40. The sequence of operations in this process is the same as that carried out by the image processing unit 16 in the image reading apparatus 10 earlier described in connection with the image processing system 1. In the image processing system 2, the image and information transmission performed in step S312 is omitted, because the decision process and binarization process are performed by the image processing unit 46 contained in the information processing apparatus 40.

Likewise, when the process illustrated in the flowchart of FIG. 13 or 15 is applied to the image processing system 2, the process of step S1301 or S1501 is executed primarily by the first central processing unit 35 in collaboration with the various component elements of the image reading apparatus 30 in accordance with the program prestored in the first storage unit 34, and the process of steps S1302 to S1311 or S1502 to S1511 is executed primarily by the second central processing unit 45 in collaboration with the various component elements of the information processing apparatus 40 in accordance with the program prestored in the second storage unit 44. The process of step S1301 or S1501 is the same as the process of step S301. On the other hand, the process of steps S1302 to S1311 or S1502 to S1511 is carried out by the image processing unit 46 contained in the information processing apparatus 40, and the process of step S1312 or S1512 is omitted.

As described above, when the information processing apparatus 40 is equipped with the image processing unit 46 and performs the decision process and binarization process, the same effect can be achieved as when the image reading apparatus is equipped with the image processing unit and performs the decision process and binarization process.

While the preferred embodiments thereof has been described, it will be appreciated that the present invention is not limited to the above specific embodiments. For example, the division of functionality between the image reading apparatus and the information processing apparatus is not limited to the example of the image processing system illustrated in FIG. 1 or 16, but the functional units, including those of the image processing unit, may be interchanged as desired between the image reading apparatus and the information processing apparatus. Alternatively, the image reading apparatus and the information processing apparatus may be combined into one apparatus.

Further, in the image processing system 1 of FIG. 1, the first interface unit 13 of the image reading apparatus 10 may be connected to the second interface unit 21 of the information processing apparatus 20 via a network, such as the Internet, a telephone network (including a mobile telephone network or a public switched telephone network), or an intranet, rather than directly connecting them together. In that case, the first interface unit 13 and the second interface unit 21 are each equipped with a communication interface circuit for connection to the network.

Likewise, in the image processing system 2 of FIG. 16 also, the first interface unit 33 of the image reading apparatus 30 and the second interface unit 41 of the information processing apparatus 40 may be interconnected via a network. In that case, a plurality of information processing apparatuses 40 may be installed in a distributed manner over the network so that the image processing service can be provided in the form of cloud computing, and the processing such as the decision process, image processing such as binarization, image data storage, etc. may be performed in a distributed manner with the information processing apparatuses 40 collaborating with each other. In this way, the image processing system 2 can efficiently perform the decision process and binarization process for binarizing input images generated by a plurality of image reading apparatuses 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
    a decimated image generator for generating a decimated image through pixel decimation from an input image;
    an edge pixel extractor for extracting edge pixels from said decimated image;
    an edge class extractor for extracting an isolated edge pixel from among said edge pixels;
    a histogram generator for generating an isolated histogram from only said isolated edge pixel; and
    a decision unit for making, based on said isolated histogram, a decision as to whether or not said input image contains a background element.

2. The image processing apparatus according to claim 1, wherein said edge class extractor further extracts a connected edge pixel from among said edge pixels,
    said histogram generator further generates a connected histogram based on said connected edge pixel, and
    said decision unit, based on said isolated histogram and said connected histogram, makes a decision as to whether or not said input image contains said background element.

3. The image processing apparatus according to claim 2, wherein said decision unit makes a decision as to whether or not said input image contains said background element, based on an interrelationship between a convergence rate of said connected histogram and a convergence rate of said isolated histogram.

4. The image processing apparatus according to claim 2, wherein said decision unit makes a decision as to whether or not said input image contains said background element, based on an interrelationship between a maximum value of said connected histogram and a maximum value of said isolated histogram.

5. The image processing apparatus according to claim 1, wherein said decision unit makes a decision as to whether or not said input image contains said background element, based on a convergence rate of said isolated histogram.

6. The image processing apparatus according to claim 5, wherein said decision unit obtains said convergence rate, based on a spread of a range over which a ratio relative to a maximum value of said isolated histogram is not less than a predetermined ratio.

7. An image processing method comprising:
    generating a decimated image through pixel decimation from an input image;
    extracting edge pixels from said decimated image;
    extracting an isolated edge pixel from among said edge pixels;
    generating an isolated histogram from only said isolated edge pixel; and
    based on said isolated histogram, making, using a computer, a decision as to whether or not said input image contains a background element.

8. A computer-readable, non-transitory medium storing a computer program, wherein said computer program causes a computer to execute a process, the process comprising:
    generating a decimated image through pixel decimation from an input image;
    extracting edge pixels from said decimated image;
    extracting an isolated edge pixel from among said edge pixels;
    generating an isolated histogram from only said isolated edge pixel; and
    based on said isolated histogram, making a decision as to whether or not said input image contains a background element.

9. The method according to claim 7, further extracts further comprising extracting a connected edge pixel from among said edge pixels,
    generating a connected histogram based on said connected edge pixel, and
    based on said isolated histogram and said connected histogram, making a decision as to whether or not said input image contains said background element.

10. The method according to claim 9, further comprising making a decision as to whether or not said input image contains said background element, based on an interrelationship between a convergence rate of said connected histogram and a convergence rate of said isolated histogram.

11. The method according to claim 9, further comprising making a decision as to whether or not said input image contains said background element, based on an interrelationship between a maximum value of said connected histogram and a maximum value of said isolated histogram.

12. The method according to claim 7, further comprising making a decision as to whether or not said input image contains said background element, based on a convergence rate of said isolated histogram.

13. The method according to claim 12, further comprising obtaining said convergence rate, based on a spread of a range over which a ratio relative to a maximum value of said isolated histogram is not less than a predetermined ratio.

* * * * *

UNITED STATES PATENT AND TRADEMARK OFFICE
CERTIFICATE OF CORRECTION

PATENT NO. : 8,824,796 B2  
APPLICATION NO. : 13/543605  
DATED : September 2, 2014  
INVENTOR(S) : Jiyun Du Page 1 of 1

It is certified that error appears in the above-identified patent and that said Letters Patent is hereby corrected as shown below:

In the Claims

Col. 18, line 38, Claim 9    Delete "further extracts further",  
                             Insert --further--

Signed and Sealed this  
Twenty-sixth Day of May, 2015

Michelle K. Lee  
*Director of the United States Patent and Trademark Office*